(12) United States Patent
Tamai et al.

(10) Patent No.: US 9,193,815 B2
(45) Date of Patent: Nov. 24, 2015

(54) POLYMER MEMBRANE FOR WATER TREATMENT AND METHOD FOR MANUFACTURE OF SAME

(75) Inventors: Toshihiro Tamai, Kyoto (JP); Yuki Goto, Shunan (JP); Takashi Osugi, Kyoto (JP); Ryuichi Matsuo, Kyoto (JP); Naotaka Oyabu, Kyoto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 416 days.

(21) Appl. No.: 13/582,534

(22) PCT Filed: Mar. 2, 2011

(86) PCT No.: PCT/JP2011/054746
§ 371 (c)(1),
(2), (4) Date: Sep. 4, 2012

(87) PCT Pub. No.: WO2011/108580
PCT Pub. Date: Sep. 9, 2011

(65) Prior Publication Data
US 2012/0318730 A1    Dec. 20, 2012

(30) Foreign Application Priority Data

Mar. 4, 2010  (JP) .................................. 2010-047660
Aug. 31, 2010  (JP) .................................. 2010-193487

(51) Int. Cl.
| | |
|---|---|
| B01D 63/00 | (2006.01) |
| B01D 39/00 | (2006.01) |
| B01D 39/14 | (2006.01) |
| B01D 71/28 | (2006.01) |
| C08F 214/06 | (2006.01) |
| B01D 67/00 | (2006.01) |
| B01D 69/08 | (2006.01) |
| B01D 71/76 | (2006.01) |
| C08F 214/08 | (2006.01) |
| B01D 71/30 | (2006.01) |
| B01D 71/38 | (2006.01) |
| C08F 226/10 | (2006.01) |
| C08F 220/28 | (2006.01) |
| C08F 220/20 | (2006.01) |

(52) U.S. Cl.
CPC .......... *C08F 214/06* (2013.01); *B01D 67/0093* (2013.01); *B01D 69/08* (2013.01); *B01D 71/76* (2013.01); *C08F 214/08* (2013.01); *B01D 71/30* (2013.01); *B01D 71/38* (2013.01); *B01D 2325/36* (2013.01); *C08F 220/20* (2013.01); *C08F 226/10* (2013.01); *C08F 2220/286* (2013.01); *C08F 2810/50* (2013.01)

(58) Field of Classification Search
CPC ............... B01D 67/0093; B01D 69/02; B01D 2325/38; B01D 71/06

USPC .............. 210/500.27, 500.42; 264/49, 41, 48
See application file for complete search history.

(56) References Cited

U.S. PATENT DOCUMENTS

| | | | | |
|---|---|---|---|---|
| 3,172,876 | A  * | 3/1965 | Koch ............................... | 525/60 |
| 4,812,269 | A | 3/1989 | Harttig et al. | |
| 6,010,541 | A | 1/2000 | Mettrie et al. | |
| 6,274,210 | B1 * | 8/2001 | Ebner et al. ................... | 428/35.8 |
| 6,277,155 | B1 | 8/2001 | Mettrie et al. | |
| 7,347,938 | B2 * | 3/2008 | Schneider et al. ........ | 210/500.27 |
| 7,481,996 | B2 * | 1/2009 | Ishii et al. ................... | 424/70.11 |
| 7,868,089 | B2 * | 1/2011 | Masuda et al. ................ | 525/104 |
| 2001/0047554 | A1 | 12/2001 | Mettrie et al. | |
| 2002/0004960 | A1 | 1/2002 | Mettrie et al. | |
| 2002/0147282 | A1 * | 10/2002 | Mayes et al. ................... | 525/245 |
| 2005/0126987 | A1 * | 6/2005 | Schneider et al. ........ | 210/500.37 |
| 2006/0075581 | A1 | 4/2006 | Mettrie et al. | |
| 2006/0196825 | A1 * | 9/2006 | Chen ......................... | 210/500.23 |
| 2011/0168630 | A1 * | 7/2011 | Mayes et al. ................... | 210/650 |
| 2012/0097605 | A1 * | 4/2012 | Tamai et al. ............. | 210/500.42 |
| 2012/0325746 | A1 * | 12/2012 | Tamai et al. ................... | 210/650 |

FOREIGN PATENT DOCUMENTS

| | | |
|---|---|---|
| CN | 1204957 | 1/1999 |
| EP | 2 452 741 | 5/2012 |
| JP | 61-209011 | 9/1986 |
| JP | 62-102801 | 5/1987 |
| JP | 63-125561 | 5/1988 |
| JP | 6-218254 | 8/1994 |
| JP | 08-108053 | 4/1996 |
| JP | 2000-229227 | 8/2000 |
| JP | 2003-147629 | 5/2003 |
| JP | 2004-509192 | 3/2004 |
| JP | 2009-112895 | 5/2009 |
| WO | 02/22712 | 3/2002 |
| WO | 2011/004786 | 1/2011 |
| WO | 2011/108579 | 9/2011 |

OTHER PUBLICATIONS

Supplementary European Search Report dated Aug. 1, 2013 in EP Application No. 11750689.9.
International Search Report issued Jun. 7, 2011 in International (PCT) Application No. PCT/JP2011/054746.
M. Bodzek et al., "Ultrafiltration Membranes made of Vinyl Chloride-Vinyl Acetate Copolymer", Journal of Membrane Science, vol. 76, pp. 269-279, 1993.
J. S. Kang et al., "Preparation of Chlorinated Poly(Vinyl Chloride)-g-Poly(N-Vinly-2-Pyrrolidinone) Membranes and Their Water Permeation Properties", Journal of Applied Polymer Science, vol. 88, pp. 3188-3195, 2003.
English translation of Informal Comment filed with the IB during the International phase.
Office Action issued Dec. 3, 2014 in corresponding Australian application No. 2011221917.

\* cited by examiner

*Primary Examiner* — Ana Fortuna
(74) *Attorney, Agent, or Firm* — Wenderoth, Lind & Ponack, L.L.P.

(57) ABSTRACT

A polymer membrane for water treatment composed of a vinyl chloride copolymer comprising a vinyl chloride monomer and a hydrophilic monomer.

12 Claims, No Drawings ved using various chemical
POLYMER MEMBRANE FOR WATER TREATMENT AND METHOD FOR MANUFACTURE OF SAME This application is a U.S. national stage of International Application No. PCT/JP2011/054746 filed Mar. 2, 2011.

TECHNICAL FIELD

The present invention relates to a polymer membrane for water treatment and method for the manufacture of same, and more specifically relates to a polymer membrane for water treatment with high mechanical strength and water permeability along with superior antifouling properties and method for the manufacture of same.

BACKGROUND ART

Conventionally, polymer membranes for water treatment are used for purifying water, for example, for removing turbidity from river water and groundwater, clarification of industrial water, treatment of wastewater and sewage, and as a pretreatment for seawater desalination, and the like.

Usually, such polymer membranes for water treatment are used as separation membranes in water treatment devices that utilize porous hollow fiber membranes formed from various polymer materials such as, for example, polystyrene (PS), poly(vinylidene fluoride) (PVDF), polyethylene (PE), cellulose acetate (CA), polyacrylonitrile (PAN), poly(vinyl alcohol) (PVA), polyimide (PI), and the like. In particular, polysulfone resins are frequently used due to their superior mechanical and chemical properties such as heat resistance, acid resistance, alkali resistance, and the like, and from the additional perspective of the ease of making a membrane.

In general, examples of the properties that are required in a polymer membrane for water treatment, in addition to the goal of separation properties, include having superior water permeability and superior physical strength, high stability toward a variety of chemical substances (namely, chemical resistance), less likelihood of adhesion of impurities during filtration (namely, superior antifouling properties), and the like.

For example, cellulose acetate hollow-fiber separation membranes with a superior balance of mechanical properties and improved water permeability have been proposed (see Patent Document 1).

However, this cellulose acetate hollow-fiber separation membrane has low mechanical strength and its chemical resistance is inadequate. Consequently, there is a problem in that when the separation membrane becomes contaminated, cleaning employs physical means or chemical means using chemical products and is extremely difficult. In addition, due to degradability by microorganisms, it is problematic to use membrane bioreactors (MBRs), the applications of which in sewer water treatment have increased in recent years.

Additionally, polymer membranes for water treatment have been proposed using hollow fiber membranes formed from poly(vinylidene fluoride) resin that have both superior physical strength and chemical resistance (see Patent Document 2). Even when contaminated, these polymer membranes for water treatment can be washed using various chemical agents.

However, poly(vinylidene fluoride) tends to have comparatively little hydrophilic properties, with low antifouling properties.

Furthermore, the use of vinyl chloride resins can be considered for their superior mechanical strength and chemical resistance, but the antifouling properties of vinyl chloride resins are inadequate.

Thus, to improve the antifouling properties of porous membranes using vinyl chloride resins, a type of porous polymer membrane was proposed with a vinyl chloride resin in which a hydrophilic polymer that is a cellulose derivative is coated onto a blended non-woven fabric (see Patent Document 3).

Moreover, a porous membrane was also proposed in which an ethylenediamine-polyoxyalkylene polymer is blended into a vinyl chloride resin (see Patent Document 4).

However, there are problems when blending a hydrophilic polymer, such as that controlling phase separation when a porous membrane is manufactured is difficult, a uniform membrane cannot be obtained, and its performance is not stable.

Thus, membranes for use in water filtration have been proposed to include a comb-shaped polymer from graft polymerization of poly(oxyethylene methacrylate) onto vinyl chloride resin using a copper chloride catalyst coordinated to a tetramine compound (see Patent Document 5).

This reference document describes a polymer blend membrane with a grafted main chain homopolymer and a comb-shaped polymer, with the molecular weight of the comb-shaped polymer grafted side chains being increased to improve membrane hydrophilic properties.

However, compatibility decreased when the molecular weight of the comb-shaped polymer grafted side chains was increased, raising concerns of reduced mechanical strength. In addition, there are concerns about residues from the copper chloride and tetramine compound used in the catalyst.

PRIOR ART DOCUMENTS

Patent Document

[Patent Document 1] JP H8-108053-AA
[Patent Document 2] JP 2003-147629-A
[Patent Document 3] JP 2000-229227-A
[Patent Document 4] JP 2009-112895-A
[Patent Document 5] JP 2004-509192-A

DISCLOSURE OF THE INVENTION

Problem to be Solved

In polymer membranes for water treatment of recent years, the main problems in the long-term operation of water treatment devices are the improvement of the abovementioned mechanical strength, chemical resistance, and water permeability, along with preventing a reduction in water permeability produced by the appearance of clogging due to contamination. In other words, there are high costs associated with maintenance such as chemical cleaning and backwashing to remove the membrane damage due to clogging and the blockage.

Consequently, to avoid such problems, it is desirable for the antifouling properties of the polymer membrane for water treatment itself to be improved.

Taking the abovementioned problems into consideration, the present invention has the goal of offering a polymer membrane for water treatment that maintains mechanical strength, chemical resistance, and water permeability, while combining further antifouling properties, and a method for manufacturing same.

Means to Solve the Problem

As the result of conducting a diligent study concerning a polymer membrane for water treatment that further combines improved antifouling properties while maintaining mechanical strength, chemical resistance and water permeability, the present inventors discovered that by copolymerizing a monomer that increases hydrophilic properties with poly(vinyl chloride) resin, without using any special method, they could increase the antifouling properties caused by hydrophilization while having high water permeability and separation capability, and could reduce the frequency of required maintenance with chemical washing and backwashing, and thus achieved the present invention.

That is, a polymer membrane for water treatment of the present invention, characterized in that it is composed of a vinyl chloride copolymer comprising a vinyl chloride monomer and a hydrophilic monomer as structural units.

Such polymer membrane for water treatment preferably comprises one or more below.

The hydrophilic monomer is a monomer having a hydrophilic non-ionic group.

The hydrophilic non-ionic group-containing monomer is selected a group consisting of a hydroxy-containing monomer, a hydroxyalkyl-containing monomer, polyalcohol-containing monomer, polyalkylene glycol-containing monomer which has mono-terminal alkyl ether or aryl ether and N-vinyl cyclic amide-containing monomer.

The hydrophilic non-ionic group-containing monomer is a hydroxy-containing monomer, and the hydroxy-containing monomer is vinylalcohol.

The vinyl chloride copolymer comprises a vinyl alcohol unit which has been converted from a vinyl acetate unit in the copolymerized vinyl chloride and vinyl acetate as the hydrophilic monomer unit.

The hydrophilic non-ionic group is a polyalkylene glycol-containing monomer.

The polyalkylene glycol-containing monomer is polyethylene glycol-containing monomer.

The polyalkylene glycol-containing monomer has the average degree of polymerization of 4 to 140.

The polyalkylene glycol-containing monomer comprises a polyalkylene glycol wherein all or part of the mono-terminal are substituted with at least one selected from a group consisting of $C_1$-$C_{20}$ alkyl group and $C_6$-$C_{12}$ aryl group.

The hydrophilic non-ionic group monomer is N-vinyl cyclic amido-containing monomer.

The N-vinyl cyclic amido-containing monomer is N-vinyl pyrrolidone.

The degree of polymerization of the vinyl chloride copolymer is 250 to 5000.

The vinyl chloride monomer constitutes 50 to 99 mass % of the structural units constituting the vinyl chloride copolymer.

The polymer membrane for water treatment is a porous membrane.

The polymer membrane for water treatment is a hollow-fiber membrane.

A method for manufacture of a polymer membrane for water treatment of the present invention characterized in that it is a method for manufacture of a polymer membrane for water treatment composed of vinyl chloride copolymer comprising a vinyl chloride monomer and a vinyl alcohol as structural units having;

forming the vinyl chloride-vinyl acetate copolymer into a membrane, and hydrolyzing the vinyl acetate units contained in the copolymer to convert into the vinyl alcohol unit.

Effect of the Invention

According to the present invention, it is possible to provide a polymer membrane for water treatment that maintains mechanical strength, chemical resistance, and water permeability, while combining further antifouling properties, and a method for manufacturing same.

DETAILED DESCRIPTION OF THE PREFERRED EMBODIMENTS

The polymer membrane for water treatment of the present invention is substantially composed of a vinyl chloride copolymer.

Examples of monomers that constitute a vinyl chloride copolymer include a vinyl chloride monomer and a hydrophilic monomer.

The hydrophilic monomer is a monomer that can undergo copolymerization with vinyl chloride, and is specified as a monomer that has a functional group with hydrophilic property.

The functional group with hydrophilic property means a functional group that can form hydrogen bonds with water molecules in a monomer having the functional group, and include, for example, carboxyl group, hydroxyl group, sulfonyl group, amino group, amido group, ammonium group, pyridyl group, imino group, betaine group, ester structure, ether structure, sulfo group, phosphoric acid group, and the like.

So long as the functional group with hydrophilic property is contained within the molecule of the vinyl chloride copolymer, it can be substituted/bonded to the side chain, but is preferably bonded/linked to the main chain.

In spite of the differences among hydrophilic monomers, it is possible to use identical monomers only, but combinations of different monomers can also be used. In other words, the vinyl chloride copolymer can contain either only one type of hydrophilic monomer, or two or more types of hydrophilic monomer.

Examples of the hydrophilic monomers include, for examples, (1) cationic group-containing vinyl monomers and/or salts thereof (hereinafter may be referred to as "cationic monomer") such as amino group, ammonium group, pyridyl group, imino group, betaine structure;

(2) hydrophilic non-ionic group-containing vinyl monomers and/or salts thereof (hereinafter may be referred to as "non-ionic monomer") such as hydroxyl group, amido group, ester structure, ether structure;

(3) anionic group-containing vinyl monomers and/or salts thereof (hereinafter may be referred to as "anionic monomer") such as carboxyl group, sulfonate group, phosphoric acid group;

(4) other monomers, or the like.

Specifically, (1) examples of the cationic monomer include (meth)acrylic ester or (meth)acrylic amide which has a dialkyl amino group having carbon number of 2-44 such as dimethylamino ethyl (meth)acrylate, diethylamino ethyl (meth)acrylate, dipropylamino ethyl (meth)acrylate, diisopropyl amino ethyl (meth)acrylate, dibutyl amino ethyl (meth)acrylate, diisobutyl amino ethyl (meth)acrylate, di t-butyl amino ethyl (meth)acrylate, dimethylamino propyl (meth)acrylic amide, diethylamino propyl (meth)acrylic amide, dipropylamino propyl (meth)acrylic amide, diisopropyl amino propyl (meth) acrylic amide, dibutyl amino propyl (meth)acrylic amide, diisobutyl aminopropyl (meth)acrylic amide, di t-butyl amino propyl (meth)acrylic amide, and the like;

styrene having total carbon number of 2-44 dialkyl amino group such as dimethylamino styrene, dimethylamino methyl styrene, and the like;

vinyl pyridine such as 2- or 4-vinyl pyridine, and the like;

N-vinyl heterocyclic compounds such as N-vinyl imidazole, and the like;

acid-neutralizing compounds of amino group-containing monomers, vinyl ethers, such as aminoethyl vinyl ether, dimethylamino ethyl vinyl ether, or quaternized compounds in which the monomers thereof are quaternized by halogenated alkyl (carbon number of 1-22), halogenated benzyl, alkyl (carbon number of 1-18) or aryl (carbon number of 6-24) sulfonic acid or dialkyl (total carbon number of 2-8) sulfate, and the like;

vinyl monomers having a diallyl-type quaternized ammonium salt such as dimethyl diallyl ammonium chloride, diethyl diallyl ammonium chloride, and the like, or having a betaine structure such as N-(3-sulfopropyl)-N-(meth)acryloyloxyethyl-N,N-dimethyl ammonium betaine, N-(3-sulfopropyl)-N-(meth)acryloyl amino propyl-N,N-dimethyl ammonium betaine, N-(3-carboxymethyl)-N-(meth)acryloyl amino propyl-N,N-dimethyl ammonium betaine, N-carboxymethyl-N-(meth)acryloyloxyethyl-N,N-dimethyl ammonium betaine, and the like.

Among these cationic groups, amino group-containing and ammonium group-containing monomers are preferable.

(2) examples of the non-ionic monomer include vinyl alcohol;

(meth)acrylic ester or (meta) acrylic amide which have a hydroxy alkyl (carbon number of 1-8) such as the N-hydroxypropyl (meth)acrylic amide, hydroxyethyl (meth)acrylate, N-hydroxypropyl (meta)acrylic amide, and the like;

carbon number of 1-8 polyol (meth)acrylic ester such as glycerol mono(meth)acrylate;

polyol (meth)acrylic ester, allyl ether, vinyl ether, styryl ether (in which an average degree of polymerization of polyalkylene glycol is preferably 4 to 140, and 4 to 100 is more preferred in order to secure reactivity) such as polyalkylene glycol (meth)acrylate (carbon number of 1-8, polyethyleneglycol is preferred);

(meth)acrylic amide;

alkyl (carbon number of 1-8) (meth)acrylic amide such as N-methyl (meth)acrylic amide, N-n-propyl (meth)acrylic amide, N-isopropyl (meth)acrylic amide, N-t-butyl (meth)acrylic amide, N-isobutyl (meth)acrylic amide, and the like;

dialkyl (total carbon number of 2-8) (meth)acrylic amide such as N,N-dimethyl (meth)acrylic amide, N,N-diethyl (meth)acrylic amide, N,N-dimethyl acrylic amide, N,N-diethyl acrylic amide, and the like;

diacetone (meth)acrylic amide;

N-vinyl cyclic amide such as N-vinyl pyrrolidone, and the like;

polyalkylene glycol (meth)acrylic ester, allyl ether, vinyl ether or styryl ether which has alkyl ether or aryl ether at one terminal [the alkyl group has carbon number of 1-20 and may be substituted with an aryl group (the aryl group has carbon number of 6-12 and examples thereof include phenyl, tolyl, xylyl, biphenyl, naphthyl groups, and the like); the aryl group is preferably phenyl group, and may substituted with an carbon number of 1 to 14 alkyl group; the alkylene group may be a strait or branched chain and has carbon number of 1-20, polyethylene glycol is preferred, a hydrogen atom in the polyethylene glycol may be replaced by carbon number of 1-18 alkyl group, provided that substituted ethylene glycol unit is preferably 50% or less of the total. An average degree of polymerization of polyalkylene glycol is preferably 4 to 140, and 4 to 100 is more preferred in order to secure reactivity); the styryl group may be substituted with carbon number of 1-4 alkyl or halogenated alkyl group at α- and/or β-position and may be substituted with carbon number of 1-20 alkyl group on the aromatic ring];

(meth)acrylic amide having cyclic amino group such as N-(meth)acryloyl morpholine, and the like.

Among these, vinyl alcohol; (meth)acrylic amide monomer; and hydroxy alkyl group (carbon number of 1-8)-containing (meth)acrylic ester; (meth)acrylic ester of polyol; polyalkylene glycol (meth)acrylic ester, allyl ether, vinyl ether or styryl ether which has alkyl ether or aryl ether at one terminal; and N-vinyl cyclic amido are preferred, in particular, vinyl alcohol; hydroxy alkyl group (carbon number of 1-8)-containing (meth)acrylic ester; (meth)acrylic ester of polyol; polyalkylene glycol (meth)acrylic ester, allyl ether, vinyl ether or styryl ether, polyalkylene glycol (meth)acrylic ester, allyl ether, vinyl ether or styryl ether which has alkyl ether or aryl ether at one terminal, and N-vinyl cyclic amido are more preferred.

(3) Examples of the anionic monomer include carboxylic acid monomer having polymeric unsaturated group such as (meta) acrylic acid, maleic acid, itaconic acid, etc. and/or acid anhydride thereof (in cases where having carboxyl groups more than two in one monomer);

sulfonic acid monomer having polymeric unsaturated group such as styrene sulfonic acid, 2-(meth)acrylic amide-2-alkyl (1-4 of carbon number) propanesulfonic acid, and the like;

polyalkylene glycol (meth)acrylic ester, allyl ether, vinyl ether or styryl ether which has sulfo group (—$SO_3H$) at one terminal, [the styryl group may be substituted with carbon number of 1-4 alkyl or halogenated alkyl group at α- and/or β-position and may be substituted with carbon number of 1-20 alkyl group on the aromatic ring, a hydrogen atom in the polyethylene glycol may be replaced by carbon number of 1-18 alkyl group, provided that substituted ethylene glycol unit is preferably 50% or less of the total];

phosphate monomer having polymeric unsaturated group such as vinyl phosphonic acid, (meth)acryloyloxy alkyl (1-4 of carbon number) phosphoric acid, and the like.

The anionic group may be neutralized in any neutralization degree by basic substance. In this case, all anionic groups or part of anionic group in the polymer produce salts. Examples of a positive ion in the salt include ammonium ion, trialkyl ammonium ion having total carbon number of 3-54 (e.g., trimethyl ammonium ion, triethyl ammonium ion), hydroxy alkyl ammonium ion having carbon number of 2-4, dihydroxy alkyl ammonium ion having total carbon number of 4-8, tri hydroxy alkyl ammonium ion having total carbon number of 6-12, alkali metal ions, alkaline earth metals ion, and the like.

Neutralization may be performed with a monomer and after making a polymer.

(4) Other than the vinyl monomers described above, monomers may include a monomer having the active site that is hydrogen-bondable such as maleic anhydride, maleimide, and the like.

As monomer materials, as long as they are copolymerizable with the above hydrophilic monomer or vinyl chloride, other monomers can be used.

Examples of the other monomers include, for example, (meth)acrylic acid derivatives such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, neopentyl (meth)acrylate, cyclopentyl (meth)acrylate, n-hexyl (meth)acrylate, cyclohexyl (meth)acrylate, n-octyl (meth) acrylate, isooctyl (meth)acrylate, 2-ethylhexyl (meth)acrylate, n-decyl (meth)acrylate, isodecyl (meth)acrylate, lauryl (meth)acrylate, tridecyl (meth)acrylate, stearyl (meth)acrylate, isostearyl (meth)acrylate, behenyl (meth)acrylate, phenyl (meth)acrylate, toluoyl (meth)acrylate, xylyl (meth)acrylate, benzyl (meth)acrylate, 2-ethoxyethyl(meth)acrylate, 2-butoxy(meth)acrylate, 2-phenoxy(meth)acrylate, 3-methoxypropyl (meth)acrylate, 3-ethoxypropyl (meth)acrylate, and the like;

vinyl monomers in which the hydrophilic functional group is not included in the hydrophilic monomer described above.

Also, a crosslinkable monomer can be used as the monomer material constituting vinyl chloride copolymer. Examples of the crosslinkable monomer include (meth)acrylic esters of the polyol such as ethylene glycol di(meth)acrylate, diethylene glycol di(meth)acrylate, polyethylene glycol di(meth)acrylate, propylene glycol di(meth) acrylate, dipropylene glycol di(meth)acrylate, polypropylene glycol di(meth)acrylate, 1,2-butylene glycol di(meth)acrylate, 1,3-butylene glycol di(meth)acrylate, neopentyl glycol di(meth)acrylate, glycerin di(meth)acrylate, glycerin tri (meth)acrylate, trimethylolpropane tri(meth)acrylate, pentaerythritol tetra(meth)acrylate, and the like;

acrylic amides such as N-methyl allyl acrylic amide, N-vinyl acrylic amide, N,N'-methylene bis(meth)acrylic amide, bisacrylic amide acetate;

divinyl compounds such as divinylbenzene, divinyl ether, divinyl ethylene urea, and the like;

polyallyl compounds such as diallyl phthalate, diallyl maleate, diallylamine, triallyl amine, triallyl ammonium salt, allyl-etherified compounds of pentaerythritol, allyl-etherified compounds of sucrose which has at least two allyl ether units in the molecule, and the like; and (meth)acrylic esters of unsaturated alcohol such as vinyl (meth)acrylate, allyl (meth)acrylate, 2-hydroxy-3-acryloyloxypropyl (meth)acrylate, 2-hydroxy-3-acryloyloxypropyl (meth)acrylate, and the like.

Furthermore, when the hydrophilic monomer is derived from a monomer with hydroxyl groups, for example, it is preferable for the hydroxyl group-containing monomer unit to be derived from vinyl alcohol. In other words, a vinyl chloride copolymer that is copolymerized from vinyl chloride and vinyl acetate preferably contains vinyl alcohol units from the conversion of vinyl acetate units via hydrolysis.

As a method for the introduction of vinyl alcohol units into a vinyl chloride copolymer, it is preferable firstly to copolymerize vinyl chloride and vinyl acetate, and then for the vinyl acetate units contained in the copolymer obtained to be converted to vinyl alcohol units via hydrolysis. Furthermore, it is satisfactory if the hydrolysis is not carried out on 100% of the vinyl acetate units, and the portion of the vinyl acetate units that did not convert to vinyl alcohol units can be present within a range that does not substantially damage the effect of the present invention.

In addition, an example of another method by which vinyl alcohol units can be introduced into the vinyl chloride copolymer involves firstly forming the vinyl chloride-vinyl acetate copolymer into a membrane, and thereafter hydrolyzing the vinyl acetate units contained in the copolymer.

Among other things, by forming the membrane prior to carrying out the hydrolysis, it is possible to differentiate between the part involving the design of physical properties such as permeability, strength, and the like, and the part involving hydrophilization, and the latter introduction method is preferable from the perspective of obtaining more favorable physical properties.

A degree of polymerization of about 250 to 5,000 for the vinyl chloride copolymer is suitable. In particular, when the hydrophilic monomer is a poly(alkylene glycol)-containing monomer unit, a degree of polymerization of 500 to 5,000 is preferred, and in the case of other hydrophilic monomers, 250 to 3,000 is preferred and 500 to 1,300 is further preferred. The degree of polymerization, for example, can be measured using a measurement method that complies with JIS K 6720-2. The abovementioned range for when the hydrophilic monomer is a poly(alkylene glycol)-containing monomer is larger than that for other monomers because the side chains in the former case are bulky and the measured degree of polymerization will be larger. If the degree of polymerization is too small, the water treatment membrane created will have poor strength, and if it is too large, the membrane-forming solution will have high viscosity, requiring heating to high temperatures to obtain the necessary concentration, and its dissolution in a solvent will be problematic.

Without being limiting in any particular way, the vinyl chloride monomer units will preferably constitute about 50 to 99 mass % based on the total of the vinyl chloride monomer units and the hydrophilic monomer units of the vinyl chloride copolymer. The hydrophilic monomer units will preferably constitute about 1 to 50 mass %.

In this way, by having the vinyl chloride monomer units constitute 50 mass % or greater in the vinyl chloride copolymer, the water treatment membrane and in particular hollow fiber membranes, and the like, can maintain the necessary strength along with hydrophilic properties having been imparted and antifouling properties having been improved.

It is preferable for the copolymer in the polymer membrane for water treatment of the present invention substantially to comprise only vinyl chloride monomer units and hydrophilic monomer units, but as mentioned above, a portion of these being other monomer units is satisfactory providing they are included within a range that does not damage the effect of the present invention. For example, to impart further flexibility or chemical resistance, vinyl acetate, acrylate ester, ethylene, propylene, vinylidene fluoride, and the like, can also be used.

With the goal of increasing moldability, heat stability, or the like, lubricants, heat stabilizing agents, membrane formation aids, or the like, can also be blended during membrane formation into the polymeric material constituting the polymer membrane for water treatment of the present invention within a range that does not damage the effect of the present invention.

Examples of lubricants include stearic acid, paraffin wax, and the like.

Examples of heat stabilizing agents generally used in the formation of vinyl chloride resins include tin, lead, and Ca/Zn mercaptides, metallic soaps, and the like.

Examples of membrane formation aids include hydrophilic polymers such as poly(ethylene glycol), polyvinylpyrrolidone, and the like, with various degrees of polymerization.

A porous membrane is suitable as a polymer membrane for water treatment of the present invention, and its most preferred form is hollow fibers, but commonly known forms such as, for example, a flat membrane, spiral, pleated, monolith, tubular form or the like is also satisfactory. In this case, for example, the outer diameter of the hollow fiber is about 800 to 2,000 µm and the inner diameter is about 400 to 1,200 µm. Moreover from another perspective, for example, the thickness is about 100 to 400 µm.

Any of the methods for manufacturing polymer membranes for water treatment that are well known in the art can be used, such as the thermally-induced phase separation method, the non-solvent phase separation method, the drawing method, and the like. Among these, manufacturing by the non-solvent phase separation method is preferred.

Moreover, at a transmembrane pressure difference of 100 kPa, polymer membranes for water treatment of the present invention preferably have a pure water flux of 100 L/(m²·h) or more, and more preferably of 200 L/(m²·h) or more.

In the method for manufacturing the polymer membrane for water treatment of the present invention, a copolymer of vinyl chloride and vinyl acetate are formed into a membrane shape.

Next, vinyl acetate units contained in the copolymer are converted into vinyl alcohol units by hydrolysis. While not being limiting in any particular way, an example of conditions and the like for carrying out the hydrolysis is immersion or the like of the membrane in a solvent mixture of water and methanol in which sodium hydroxide is dissolved.

In addition, water treatment can be carried out by purifying water using the abovementioned polymer membrane for water treatment. The water treatment method itself can be any suitable method well known in the art.

In this way, having a superior balance between water permeability flow rate and tensile strength, the polymer membrane for water treatment of the present invention can be suitably used as a separation membrane in an existing water treatment device and can be a suitable water treatment method for the purpose of purifying water.

EXAMPLES

Polymer membranes for water treatment and methods for their manufacture of the present invention are described in detail below based on a working example. Furthermore, the present invention is not limited in any way to this working example. In addition, unless specifically stated otherwise, the blending quantities in the working example is by weight.

Working Example 1

A copolymer resin containing vinyl chloride monomer units and hydroxyethyl methacrylate monomer units in a weight ratio of 77:23 was manufactured by the suspension polymerization method. The copolymer resin had a degree of polymerization of 1,000. 15 wt % copolymer resin, and 10 wt % poly(ethylene glycol) 400 as a membrane formation aid, were dissolved in 75 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

Additionally, the pure water flux of the hollow fiber membrane obtained was measured under conditions with a transmembrane pressure difference of 100 kPa (in the same manner as for the working examples below) at 25° C., and the result was 500 L/m²·h·atm.

Furthermore, the tensile strength measured at conditions of 23° C., 100 mm/min (in the same manner as for the working examples below) was 2.4 N/fiber.

When a 50 ppm γ-globulin aqueous solution is filtered using this membrane under the same conditions used to evaluate the abovementioned pure water flux (in the same manner as for the working examples below), as shown in Table 1, the relative permeability compared to pure water flux was about 60%.

Working Example 2

A copolymer resin containing vinyl chloride monomer units and vinyl acetate monomer units in a weight ratio of 78:22 was manufactured by the suspension polymerization method. The obtained copolymer resin was hydrolyzed by sodium hydroxide to obtain vinyl chloride resin-vinyl alchole copolymer in which part of the vinyl acetate monomer has been vinyl-alcoholized. The copolymer resin had a degree of polymerization of 1,000. 18 wt % copolymer resin, and 10 wt % poly(ethylene glycol) 6000 as a membrane formation aid, were dissolved in 72 wt % dimethylacetamide, and a porous hollow fiber membrane was obtained by continuous discharge through a hollow fiber nozzle followed by phase separation in a water bath.

The pure water flux of the hollow fiber membrane obtained was 100 L/m²·hr·atm.

When a 50 ppm γ-globulin aqueous solution is filtered using this membrane, as shown in Table 1, the relative permeability compared to pure water flux was about 80%.

Working Example 3

A copolymer resin containing vinyl chloride monomer units and vinyl acetate monomer units in a weight ratio of 78:22 was manufactured by the suspension polymerization method. The copolymer resin had a degree of polymerization of 1,000. 18 wt % copolymer resin, and 10 wt % poly(ethylene glycol) 6000 as a membrane formation aid, were dissolved in 72 wt % dimethylacetamide, and a porous hollow fiber membrane was obtained by continuous discharge through a hollow fiber nozzle followed by phase separation in a water bath.

The obtained hollow fiber was hydrolyzed by sodium hydroxide to obtain hollow fiber of vinyl chloride resin-vinyl alchole copolymer in which part of the vinyl acetate monomer has been vinyl-alcoholized.

The pure water flux of the hollow fiber membrane obtained was 200 L/m²·hr·atm.

When a 50 ppm γ-globulin aqueous solution is filtered using this membrane, as shown in Table 1, the relative permeability compared to pure water flux was about 80%.

Working Example 4

A copolymer resin containing vinyl chloride monomer units and methoxy polyethylene glycol methacrylate monomer units (a degree of ethylene glycol: about 9) in a weight ratio of 64:36 was manufactured by the suspension polymerization method. The copolymer resin had a degree of polymerization of 1,000. 20 wt % copolymer resin, and 10 wt % poly(ethylene glycol) 400 as a membrane formation aid, were dissolved in 70 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 400 L/m²·hr·atm.

Furthermore, the tensile strength was 2.5 N/fiber.

When a 50 ppm γ-globulin aqueous solution is filtered using this membrane, as shown in Table 1, the relative permeability compared to pure water flux was about 84%.

Working Example 5

15 wt % copolymer resin obtained in Working Example 4, 5 wt % vinyl chloride resin (a degree of polymerization 800), and 15 wt % poly(ethylene glycol) 1000 as a membrane formation aid, were dissolved in 65 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 440 L/m²·hr·atm.

Furthermore, the tensile strength was 2.9 N/fiber.

When a 50 ppm γ-globulin aqueous solution is filtered using this membrane, as shown in Table 1, the relative permeability compared to pure water flux was about 80%.

Working Example 6

10 wt % copolymer resin obtained in Working Example 4, 10 wt % vinyl chloride resin (a degree of polymerization 800), and 20 wt % poly(ethylene glycol) 1000 as a membrane formation aid, were dissolved in 60 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 540 L/m²·hr·atm.

Furthermore, the tensile strength was 3.2 N/fiber.

When a 50 ppm γ-globulin aqueous solution is filtered using this membrane, as shown in Table 1, the relative permeability compared to pure water flux was about 76%.

Working Example 7

5 wt % copolymer resin obtained in Working Example 4, 15 wt % vinyl chloride resin (a degree of polymerization 800), and 20 wt % poly(ethylene glycol) 1000 as a membrane formation aid, were dissolved in 60 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 550 L/m²·hr·atm.

Furthermore, the tensile strength was 3.6 N/fiber.

When a 50 ppm γ-globulin aqueous solution is filtered using this membrane, as shown in Table 1, the relative permeability compared to pure water flux was about 71%.

Working Example 8

A copolymer resin containing vinyl chloride monomer units and methoxy polyethylene glycol methacrylate monomer units (a degree of ethylene glycol: about 9) in a weight ratio of 50:50 was manufactured by the suspension polymerization method. The copolymer resin had a degree of polymerization of 800. 8 wt % this copolymer resin, 12 wt % vinyl chloride resin (a degree of polymerization 1000) and 10 wt % poly(ethylene glycol) 400 as a membrane formation aid, were dissolved in 70 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 540 L/m²·hr·atm.

Furthermore, the tensile strength was 3.3 N/fiber.

When a 50 ppm γ-globulin aqueous solution is filtered using this membrane, as shown in Table 1, the relative permeability compared to pure water flux was about 75%.

Working Example 9

A copolymer resin containing vinyl chloride monomer units and methoxy polyethylene glycol methacrylate monomer units (a degree of ethylene glycol: about 23) in a weight ratio of 83:17 was manufactured by the suspension polymerization method. The copolymer resin had a degree of polymerization of 1100. 17 wt % this copolymer resin and 10 wt % poly(ethylene glycol) 400 as a membrane formation aid, were dissolved in 73 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 600 L/m²·hr·atm.

When a 50 ppm γ-globulin aqueous solution is filtered using this membrane, as shown in Table 1, the relative permeability compared to pure water flux was about 77%.

Working Example 10

A copolymer resin containing vinyl chloride monomer units and methoxy polyethylene glycol methacrylate monomer units (a degree of ethylene glycol: about 4) in a weight ratio of 83:17 was manufactured by the suspension polymerization method. The copolymer resin had a degree of polymerization of 900. 10 wt % this copolymer resin, 10 wt % vinyl chloride resin (a degree of polymerization 800) and 10 wt % poly(ethylene glycol) 400 as a membrane formation aid, were dissolved in 70 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 570 L/m²·hr·atm.

When a 50 ppm γ-globulin aqueous solution is filtered using this membrane, as shown in Table 1, the relative permeability compared to pure water flux was about 70%.

Working Example 11

A copolymer resin containing vinyl chloride monomer units and methoxy polyethylene glycol methacrylate monomer units (a degree of ethylene glycol: about 90) in a weight ratio of 80:20 was manufactured by the suspension polymerization method. The copolymer resin had a degree of polymerization of 1400. 16 wt % this copolymer resin and 10 wt % poly(ethylene glycol) 400 as a membrane formation aid, were dissolved in 74 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 460 L/m²·hr·atm.

When a 50 ppm γ-globulin aqueous solution is filtered using this membrane, as shown in Table 1, the relative permeability compared to pure water flux was about 80%.

Working Example 12

A copolymer resin containing vinyl chloride monomer units, methoxy polyethylene glycol methacrylate monomer units (a degree of ethylene glycol: about 9) and methoxy polyethylene glycol methacrylate monomer units (a degree of ethylene glycol: about 23) in a weight ratio of 68:24:8 was manufactured by the suspension polymerization method. The copolymer resin had a degree of polymerization of 1000. 6 wt % this copolymer resin, 14 wt % vinyl chloride resin (a degree of polymerization 800) and 10 wt % poly(ethylene glycol) 400 as a membrane formation aid, were dissolved in 70 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 500 L/m²·hr·atm.

Furthermore, the tensile strength was 4.0 N/fiber.

When a 50 ppm γ-globulin aqueous solution is filtered using this membrane, as shown in Table 1, the relative permeability compared to pure water flux was about 80%.

Working Example 13

A copolymer resin containing vinyl chloride monomer units and stearoxy polyethylene glycol methacrylate monomer units (a degree of ethylene glycol: about 30) in a weight ratio of 75:25 was manufactured by the suspension polymerization method. The copolymer resin had a degree of polymerization of 1000. 8 wt % this copolymer resin, 8 wt % vinyl chloride resin (a degree of polymerization 800) and 15 wt % poly(ethylene glycol) 400 as a membrane formation aid, were dissolved in 69 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 450 L/m²·hr·atm.

When a 50 ppm γ-globulin aqueous solution is filtered using this membrane, as shown in Table 1, the relative permeability compared to pure water flux was about 70%.

Working Example 14

A copolymer resin containing vinyl chloride monomer units and phenoxy polyethylene glycol acrylate monomer units (a degree of ethylene glycol: about 5.5) in a weight ratio of 70:30 was manufactured by the suspension polymerization method. The copolymer resin had a degree of polymerization of 800. 10 wt % this copolymer resin, 10 wt % vinyl chloride resin (a degree of polymerization 800) and 15 wt % poly (ethylene glycol) 400 as a membrane formation aid, were dissolved in 65 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 400 L/m²·hr·atm.

When a 50 ppm γ-globulin aqueous solution is filtered using this membrane, as shown in Table 1, the relative permeability compared to pure water flux was about 70%.

Working Example 15

A copolymer resin containing vinyl chloride monomer units nonylphenoxy polyethylene glycol acrylate monomer units (a degree of ethylene glycol: about 30) in a weight ratio of 70:30 was manufactured by the suspension polymerization method. The copolymer resin had a degree of polymerization of 1200. 17 wt % this copolymer resin and 10 wt % poly (ethylene glycol) 400 as a membrane formation aid, were dissolved in 73 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 530 L/m²·hr·atm.

When a 50 ppm γ-globulin aqueous solution is filtered using this membrane, as shown in Table 1, the relative permeability compared to pure water flux was about 60%.

Working Example 16

A copolymer resin containing vinyl chloride monomer units and polyethylene glycol mono-methacrylate monomer units (a degree of ethylene glycol: about 8) in a weight ratio of 94:6 was manufactured by the suspension polymerization method. The copolymer resin had a degree of polymerization of 1000. 17 wt % this copolymer resin and 10 wt % poly (ethylene glycol) 400 as a membrane formation aid, were dissolved in 73 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 500 L/m²·r·atm.

When a 50 ppm γ-globulin aqueous solution is filtered using this membrane, as shown in Table 1, the relative permeability compared to pure water flux was about 65%.

Working Example 17

A copolymer resin containing vinyl chloride monomer units and methoxy polyethylene glycol allyl ether monomer units (a degree of ethylene glycol: about 13) in a weight ratio of 87:13 was manufactured by the suspension polymerization method. The copolymer resin had a degree of polymerization of 1000. 9 wt % this copolymer resin, 9 wt % vinyl chloride resin (a degree of polymerization 800) and 10 wt % poly (ethylene glycol) 400 as a membrane formation aid, were dissolved in 72 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 560 L/m²·hr·atm.

When a 50 ppm γ-globulin aqueous solution is filtered using this membrane, as shown in Table 1, the relative permeability compared to pure water flux was about 75%.

Working Example 18

A copolymer resin containing vinyl chloride monomer units and polyoxy ethylene-1-(allyoxymethyl) alkyl ether ammonium sulfate monomer units (a degree of ethylene glycol: about 11, a mixture of decyl group and dodecyl group for alkyl group) in a weight ratio of 85:15 was manufactured by the suspension polymerization method. The copolymer resin had a degree of polymerization of 800. 19 wt % this copolymer resin and 11 wt % poly(ethylene glycol) 400 as a membrane formation aid, were dissolved in 70 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 550 L/m²·hr·atm.

When a 50 ppm γ-globulin aqueous solution is filtered using this membrane, as shown in Table 1, the relative permeability compared to pure water flux was about 77%.

Working Example 19

A copolymer resin containing vinyl chloride monomer units and N-vinyl-2-pyrrolidone monomer units in a weight ratio of 84:16 was manufactured by the suspension polymerization method. The copolymer resin had a degree of polymerization of 700. 17 wt % this copolymer resin and 20 wt % poly(ethylene glycol) 400 as a membrane formation aid, were dissolved in 63 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 640 L/m²·hr·atm.

When a 50 ppm γ-globulin aqueous solution is filtered using this membrane, as shown in Table 1, the relative permeability compared to pure water flux was about 60%.

Working Example 20

A copolymer resin containing vinyl chloride monomer units and methoxy polyethylene glycol methacrylate monomer units (a degree of ethylene glycol: about 90) in a weight ratio of 74:26 was manufactured by the suspension polymerization method. The copolymer resin had a degree of polymerization of 4800. 15 wt % this copolymer resin and 15 wt % poly(ethylene glycol) 400 as a membrane formation aid, were dissolved in 70 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 730 L/m²·hr·atm.

When a 50 ppm γ-globulin aqueous solution is filtered using this membrane, as shown in Table 1, the relative permeability compared to pure water flux was about 72%.

Working Example 21

A copolymer resin containing vinyl chloride monomer units and methoxy polyethylene glycol methacrylate monomer units (a degree of ethylene glycol: about 9) in a weight ratio of 56:44 was manufactured by the suspension polymerization method. The copolymer resin had a degree of polymerization of 520. 4.5 wt % this copolymer resin, 10.5 wt % vinyl chloride resin (a degree of polymerization 1300) and 15 wt % poly(ethylene glycol) 1000 as a membrane formation aid, were dissolved in 70 wt % dimethylacetamide, and a porous hollow fiber membrane was obtained by continuous discharge through a hollow fiber nozzle followed by phase separation in a water bath.

The hollow fiber membrane obtained had an inner diameter of 0.8 mm and an outer diameter of 1.4 mm.

The pure water flux of the hollow fiber membrane obtained was 650 L/m²·hr·atm.

When a 50 ppm γ-globulin aqueous solution is filtered using this membrane, as shown in Table 1, the relative permeability compared to pure water flux was about 82%.

Comparative Example 1

Poly(vinyl chloride) was manufactured into a hollow fiber membrane in the same manner as in Working Example 1.

The pure water flux of the hollow fiber membrane obtained was 500 L/m²·hr·atm.

When a 50 ppm γ-globulin aqueous solution is filtered using this membrane, as shown in Table 1, the relative permeability compared to pure water flux was about 20%.

TABLE 1

|  | Pure water flux (L/m² · hr · atm) | γ-globulin flux | Tensile strength (N/fiber) | Relative permeability |
| --- | --- | --- | --- | --- |
| EX. 1 | 500 | 300 | 2.4 | 60% |
| EX. 2 | 100 | 80 | — | 80% |
| EX. 3 | 200 | 160 | — | 80% |
| EX. 4 | 400 | 336 | 2.5 | 84% |
| EX. 5 | 440 | 352 | 2.9 | 80% |
| EX. 6 | 540 | 410 | 3.2 | 76% |
| EX. 7 | 550 | 390 | 3.6 | 71% |
| EX. 8 | 540 | 405 | 3.3 | 75% |
| EX. 9 | 600 | 462 | — | 77% |
| EX. 10 | 570 | 400 | — | 70% |
| EX. 11 | 460 | 368 | — | 80% |
| EX. 12 | 500 | 400 | 4.0 | 80% |
| EX. 13 | 450 | 315 | — | 70% |
| EX. 14 | 400 | 280 | — | 70% |
| EX. 15 | 530 | 318 | — | 60% |
| EX. 16 | 500 | 325 | — | 65% |
| EX. 17 | 560 | 420 | — | 75% |
| EX. 18 | 550 | 423 | — | 77% |
| EX. 19 | 640 | 384 | — | 60% |
| EX. 20 | 730 | 526 | — | 72% |
| EX. 21 | 650 | 533 | — | 82% |
| Comp. Ex. 1 | 500 | 100 | — | 20% |

As shown in Table 1, the substantial difference in relative permeability is observed in the working example and comparative example confirms that the antifouling properties in the working example are improved.

In other words, it is confirmed that the polymer membrane for water treatment of the present invention is less likely to become fouled, and maintains a sufficient level of water permeability even during filtration.

In this way, being less likely to become fouled, the membrane suffers less damage, needs less frequent maintenance with backwashing or chemical washing, and is extremely advantageous from the economic standpoint.

INDUSTRIAL APPLICABILITY

Regardless of whether or not it is applicable to a water treatment device and the circumstances of the water treatment device, the present invention can be used as a membrane for purifying water, such as for removing turbidity from river water and groundwater, clarification of industrial water, treatment of wastewater and sewage, and as a pretreatment for seawater desalination, and the like.

The invention claimed is:

1. A polymer membrane for water treatment composed of a vinyl chloride copolymer, excepting graft-copolymers, that comprises a vinyl chloride monomer and a hydrophilic non-ionic group-containing monomer of a poly(alkylene glycol)-containing monomer or a N-vinyl cyclic amide-containing monomer as structural units, and
    a hydrophilic functional group contained in the hydrophilic monomer is substituted/bonded to the main chain of the vinyl chloride copolymer.

2. The polymer membrane for water treatment according to claim 1, wherein the poly(alkylene glycol)-containing monomer is a poly(ethylene glycol)-containing monomer.

3. The polymer membrane for water treatment according to claim 2, wherein the average degree of polymerization of the poly(alkylene glycol) is 4 to 140.

4. The polymer membrane for water treatment according to claim 1, wherein the average degree of polymerization of the poly(alkylene glycol) is 4 to 140.

5. The polymer membrane for water treatment according to claim 2, wherein the polyalkylene glycol-containing monomer comprises a polyalkylene glycol wherein all or part of the mono-terminal are substituted with at least one selected from a group consisting of $C_1$-$C_{20}$ alkyl group and $C_6$-$C_{12}$ aryl group.

6. The polymer membrane for water treatment according to claim 4, wherein the polyalkylene glycol-containing monomer comprises a polyalkylene glycol wherein all or part of the mono-terminal are substituted with at least one selected from a group consisting of $C_1$-$C_{20}$ alkyl group and $C_6$-$C_{12}$ aryl group.

7. The polymer membrane for water treatment according to claim 1, wherein the polyalkylene glycol-containing monomer comprises a polyalkylene glycol wherein all or part of the mono-terminal are substituted with at least one selected from a group consisting of $C_1$-$C_{20}$ alkyl group and $C_6$-$C_{12}$ aryl group.

8. The polymer membrane for water treatment according to claim 1, wherein the N-vinyl cyclic amide-containing monomer is N-vinylpyrrolidone.

9. The polymer membrane for water treatment according to claim 1, wherein the degree of polymerization of the vinyl chloride copolymer is 250 to 5000.

10. The polymer membrane for water treatment according to claim 1, wherein vinyl chloride monomer constitutes 50 to 99 mass % of the structural units constituting the vinyl chloride copolymer.

11. The polymer membrane for water treatment according to claim 1, wherein the polymer membrane for water treatment is a porous membrane.

12. The polymer membrane for water treatment according to claim 1, wherein the polymer membrane for water treatment is a hollow-fiber membrane.

* * * * *